US012124834B2

(12) United States Patent
Chijiwa et al.

(10) Patent No.: US 12,124,834 B2
(45) Date of Patent: Oct. 22, 2024

(54) PROCESSING SERVER, PROCESSING METHOD AND PROCESSING PROGRAM (71) Applicant: Nippon Telegraph and Telephone Corporation, Tokyo (JP)

(72) Inventors: Daiki Chijiwa, Musashino (JP); Kenji Umakoshi, Musashino (JP); Tomohiro Inoue, Musashino (JP); Daigoro Yokozeki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 168 days.

(21) Appl. No.: 17/797,544

(22) PCT Filed: Feb. 7, 2020

(86) PCT No.: PCT/JP2020/004853
§ 371 (c)(1),
(2) Date: Aug. 4, 2022

(87) PCT Pub. No.: WO2021/157059
PCT Pub. Date: Aug. 12, 2021

(65) Prior Publication Data
US 2023/0054948 A1    Feb. 23, 2023

(51) Int. Cl.
*G06F 8/65* (2018.01)
(52) U.S. Cl.
CPC ...................... *G06F 8/65* (2013.01)
(58) Field of Classification Search
CPC . G06F 8/65; G06F 21/60; G06F 21/54; G06F 21/10; G06F 8/71; G06F 11/3688; G06F 8/70
See application file for complete search history.

(56) References Cited

U.S. PATENT DOCUMENTS

| 10,303,464 | B1 * | 5/2019 | Wolfson | G06F 11/368 |
| 10,606,585 | B1 * | 3/2020 | Safronoff | G06F 8/71 |
| 10,824,541 | B1 * | 11/2020 | Kongara | G06F 8/71 |
| 2016/0179509 | A1 * | 6/2016 | Raghavan | G06F 8/71 717/121 |
| 2016/0371172 | A1 * | 12/2016 | Rumsey | G06F 8/65 |

OTHER PUBLICATIONS

Charles E. McDowell et al.; Debugging Concurrent Programs; ACM; pp. 593-622; retrieved on May 30, 2024 (Year: 1989).*
[No Author Listed] [online], "Open-source Version Control System for Machine Learning Projects," dvc.org, retrieved on Dec. 26, 2019, retrieved from URL <https://dvc.org/features>, 1 page.

* cited by examiner

*Primary Examiner* — S. Sough
*Assistant Examiner* — Cuong V Luu
(74) *Attorney, Agent, or Firm* — Fish & Richardson P.C.

(57) ABSTRACT

A processing server includes a storage device that stores program revision data for identifying a revision of a program and the program of the revision, and runtime revision data for identifying a revision of runtime data input and output to and from the program and the runtime data of the revision, a generating unit that, after receiving a revision of a program that is a target of execution, secures an execution area in the storage device and generates execution target data for executing the program of the revision that is the target of execution in the secured execution area, and an executing unit that executes the execution target data using the runtime data that is the target of execution in the execution area.

7 Claims, 10 Drawing Sheets

| TYPE OF PROGRAM | REVISION OF PROGRAM | IDENTIFYING DATA OF PROGRAM |
|---|---|---|
| ProgramA | Rev1 | **** |
| ProgramB | Rev1 | **** |
| ProgramA | Rev2 | **** |
| **** | **** | **** |

11 PROGRAM REVISION DATA

Fig. 3

| REVISION OF RUNTIME DATA | PARENT REVISION | CHILD REVISION | IDENTIFYING DATA OF EACH FILE | LOG DATA |
|---|---|---|---|---|
| DataRev1 | (Null) | DataRev2<br>DataRev3 | FileA : XXXX<br>FileB : XXXX<br>FileC : XXXX | XXXX.log |
| DataRev2 | DataRev1 | DataRev4 | FileC : XXXX | XXXX.log |
| DataRev3 | DataRev1 | (Null) | FileB : XXXX | XXXX.log |
| DataRev4 | DataRev2 | (Null) | FileB : XXXX | XXXX.log |

12 RUNTIME REVISION DATA

Fig. 4

| COMMAND TEXT STRING | REVISION OF PROGRAM | REVISION OF RUNTIME DATA |
|---|---|---|
| ProgramA······ | Rev1 | DataRev1 |
| ···· | ···· | ···· |
| ···· | ···· | ···· |

13 PROGRAM EXECUTION HISTORY DATA

PROCESSING SERVER, PROCESSING METHOD AND PROCESSING PROGRAM

CROSS-REFERENCE TO RELATED APPLICATIONS

This application is a National Stage application under 35 U.S.C. § 371 of International Application No. PCT/JP2020/004853, having an International Filing Date of Feb. 7, 2020, the disclosure of which is considered part of the disclosure of this application, and is incorporated b reference in its entirety into this application.

TECHNICAL FIELD

The present invention relates to a processing server, a processing method, and a processing program.

BACKGROUND ART

Programs such as machine learning programs may be executed while revising the program code, and there is a need to manage the program code and revisions thereof. There also is a need to manage revisions with regard to runtime data used in runtime of the program in order to record execution results of the program without fail and to secure reproducibility of the results.

There is a function of version management of learning data and a file group generated while executing learning, for example (NPL 1).

CITATION LIST

[NPL 1] "Open-source Version Control System for Machine Learning Projects", [online], [retrieved on Jan. 27, 2020], Internet <URL: dvc.org/features>

SUMMARY OF THE INVENTION

Technical Problem

However, in the functions of NPL 1, version management of file groups is dependent on human work and management of file groups is not guaranteed. Also, file groups are not managed appropriately and therefore there are cases in which reproducibility of program execution results is not ensured.

The present invention has been devised in view of the above problems, and an object of the present invention is to provide a technology that is capable of ensuring reproducibility of program execution results.

Means for Solving the Problem

A processing server of an aspect of the present invention includes a storage device that stores program revision data for identifying a revision of a program and the program of the revision, and runtime revision data for identifying a revision of runtime data input and output to and from the program and the runtime data of the revision, a generating unit that, after receiving a revision of a program that is a target of execution, secures an execution area in the storage device and generates execution target data for executing the program of the revision that is the target of execution in the secured execution area, and an executing unit that executes the execution target data using the runtime data that is the target of execution in the execution area.

A processing method of an aspect of the present invention is executed by a computer. The method includes a step of storing, in a storage device, program revision data for identifying a revision of a program and the program of the revision, and runtime revision data for identifying a revision of runtime data input and output to and from the program and runtime data of the revision, a step of, after receiving a revision of a program that is a target of execution, securing an execution area in the storage device and generating execution target data for executing the program of the revision that is the target of execution in the secured execution area, and a step of executing the execution target data using runtime data that is the target of execution in the execution area.

An aspect of the present invention provides a processing program which causes a computer to function as the above processing server.

Effects of the Invention

According to the present invention, it is possible to provide a technology that is capable of ensuring reproducibility of program execution results.

DESCRIPTION OF EMBODIMENTS

An embodiment of the present invention will be described below with reference to the drawings. In the drawings, identical portions are denoted by identical reference numerals, and description thereof will be omitted.

(Processing Server)

A processing server 1 according to an embodiment of the present invention performs revision management of each of a program executed by the processing server 1 and runtime data input and output to and from the program and ensures reproducibility of execution results of the program.

Figure 1:
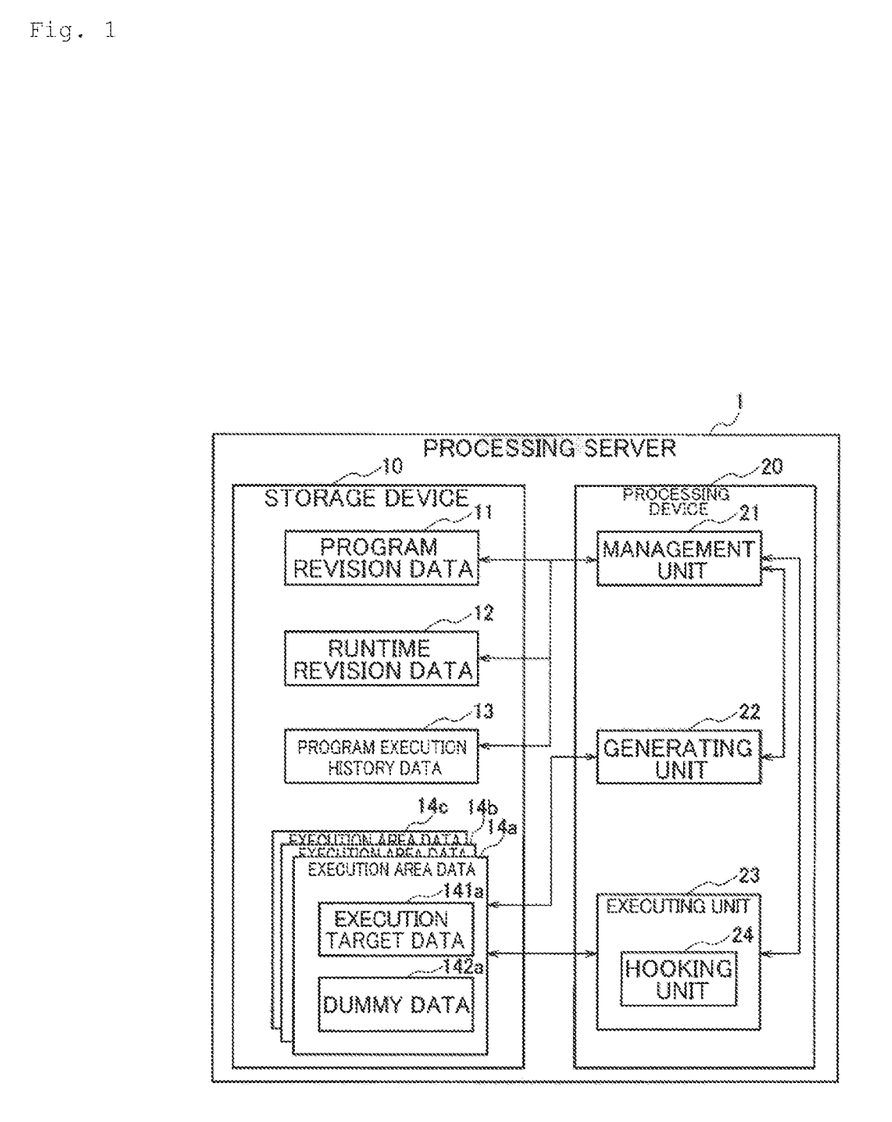
FIG. 1 is a diagram for explaining functional blocks of a processing server according to an embodiment of the present invention.

A processing program in the embodiment of the present invention is a program for causing a computer to function as each portion illustrated in FIG. 1. Meanwhile, the program that is a target of revision management by the processing server 1 will be simply referred to as a program.

Any program will suffice as long as the program generates output and input of data, but a program regarding which several versions are generated such as requiring a plurality of alterations of program code and the like is preferable. The program may contain script. The program according to the embodiment of the present invention may be a set of a plurality of programs or may be a combination of one or more programs and one or more scripts.

Any data will suffice as the runtime data as long as the data is input and output to and from the program. The runtime data may be divided into a plurality of files. The runtime data may include data of each of files input to the program, files output by the program, and files output by the program and then further input. The runtime data according to the embodiment of the present invention preferably includes data of files input to and output from the program without fail.

For example, the program is a program used for machine learning. The processing server 1 according to the embodiment of the present invention manages the revisions of the program in which an algorithm for machine learning has been retrofitted and also manages revisions of data input to and output from the program. The data input to and output from the program includes datasets that are used for learning and that are input to the program and also data such as model files output as learning results, metric logs, and the like.

A program in another example is a program used for processing experiment data. The processing server 1 according to the embodiment of the present invention manages the revisions of the program in which an algorithm for processing experiment data has been retrofitted and also manages revisions of data input to and output from the program. The data input to and output from the program includes datasets of values obtained by means of experiments that are input to the program and also includes data output as analysis results of experiments.

In this way, the usage of the program and the runtime data managed by the processing server 1 according to the embodiment of the present invention is not limited.

The processing server 1 includes a storage device 10 and a processing device 20.

The storage device 10 stores the processing program for mounting the functions of the processing server 1. The storage device 10 also stores program revision data 11, runtime revision data 12, program execution history data 13, and pieces of execution area data 14a, 14b, and 14c for managing the program and the runtime data.

In the embodiment of the present invention, the program revision data 11, the runtime revision data 12, and the program execution history data 13 are controlled to accept access from a management unit 21 which will be described later while not accepting access from a generating unit 22 and an executing unit 23, and access by user operations. Also, the pieces of execution area data 14a, 14b, and 14c are controlled to accept access from the generating unit 22 and the executing unit 23 while not accepting access from the management unit 21 and access by user operations.

The program revision data 11 identifies revisions of a program and the program of the revisions. The program revision data 11 holds revisions and data of the program of the revisions in a correlated manner, for example. The program revision data 11 may correlate a revision and a link to a data area where the data of the program of the revisions is stored. Also, the program revision data 11 may correlate a revision and difference as to the program of a previous revision.

Figure 2:
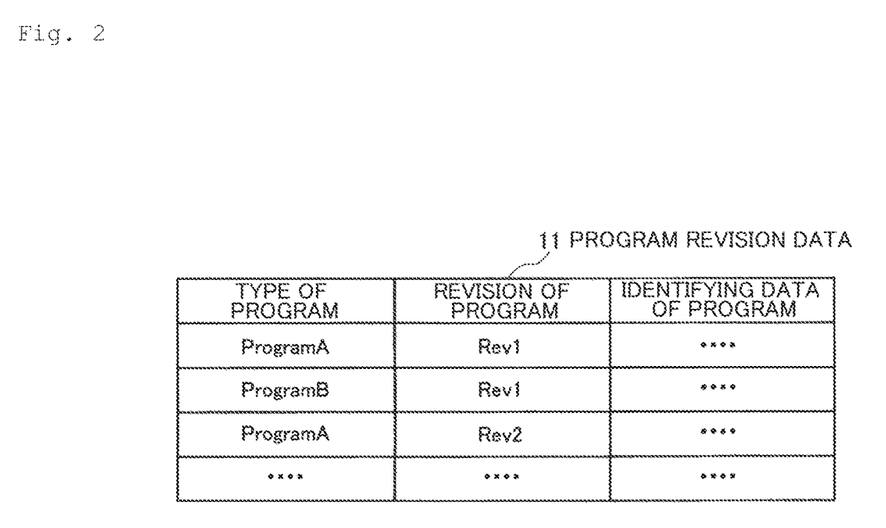
FIG. 2 is a diagram for explaining an example of a data structure and data of program revision data.

The program revision data 11 illustrated in FIG. 2 correlates types of programs with revisions of programs and identifying data of programs. The program revision data 11 illustrated In FIG. 2 handles a plurality of types of programs, with one type of program being identified with regard to a program type and program revision.

The runtime revision data 12 identifies revisions of runtime data input to and output from the program and runtime data of the revisions. Each time the program is executed, a new revision is imparted. The runtime revision data 12 correlates, with the new revision, runtime data of the new revision.

Figure 3:
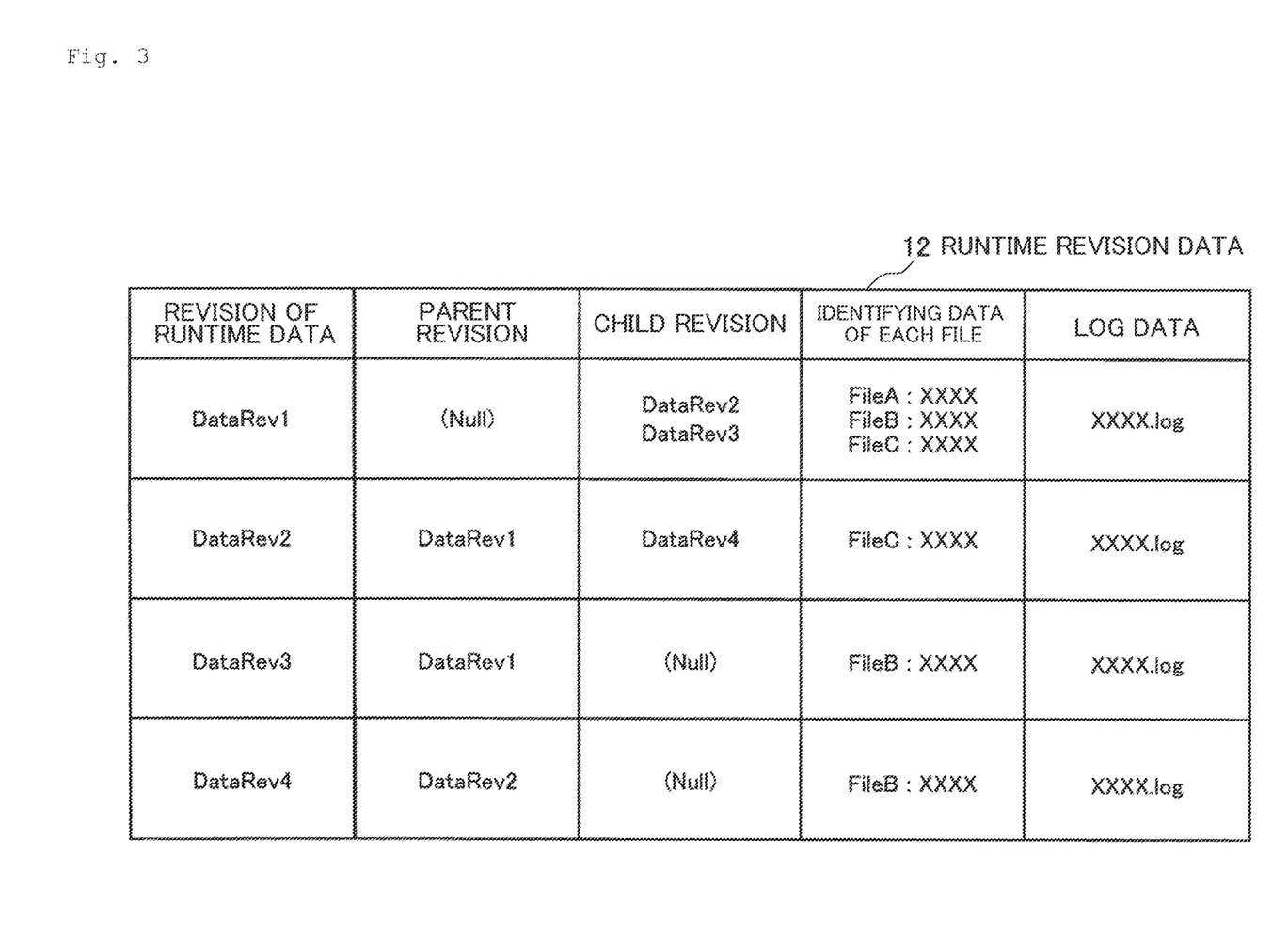
FIG. 3 is a diagram for explaining an example of a data structure and data of runtime revision data.

The runtime revision data 12 shown in FIG. 3 correlates revisions of runtime data, parent revisions, child revisions, identifying data of each file, and log data. The revisions of runtime data are revisions for identifying runtime data generated each time the processing server 1 executes the program.

The parent revisions are revisions serving as derivation sources for revisions of runtime data. In the example illustrated in FIG. 3, the runtime revision data 12 holds data of difference between parent revisions and runtime data of the parent revisions, in a manner correlated with revisions of runtime data. Child revisions are revisions derived from revisions of runtime data.

Identifying data of each file identifies the data of each file used in revision of runtime data. Identifying data of each file holds, for each revision, an identifier of a file belonging to that revision and data of that file in a correlated manner, for example. Identifying data of each file may be a link to a data area where the data of each file is stored or may be difference between the parent revisions and the data.

Identifying data of each file in the embodiment of the present invention has correlated thereto a difference as to identifying data of a parent revision. In the example illustrated in FIG. 3, no parent revision is set for DataRev1, and therefore data of three files of FileA, FileB, and FileC is correlated with identifying data of each file. Meanwhile, DataRev2, of which DataRev1 is the parent revision, has the data of FileC correlated to the identifying data of each file. This indicates that while DataRev1 and DataRev2 have difference in FileC, there is no difference in FileA and FileB. DataRev3, of which DataRev1 is the parent revision, has the data of FileB correlated to the identifying data of each file. This indicates that while DataRev1 and DataRev3 have difference in FileB, there is no difference in FileA and FileC.

Note that for the data set as identifying data for each file in the runtime revision data 12, it is sufficient if the data of each file is identified. The data may be all data of the file, or may be difference data between the data of the same file name of the parent revision or a revision traced back through the parent revision, such as the parent revision of the parent revision, or the like. In the example illustrated in FIG. 3, the data of FileC correlated with DataRev2 may be the entire data of FileC of DataRev2, or may be data of difference as to FileC of DataRev1.

Log data is runtime log data of the program corresponding to the runtime data. Log data is data in which date and time of access to the runtime data, identifier of the program of the accessing source, type of access of input or output, identifier of file of accessing destination, and the like, are correlated, for example. Log data enables input and output of data during program runtime to be tracked.

Figure 4:
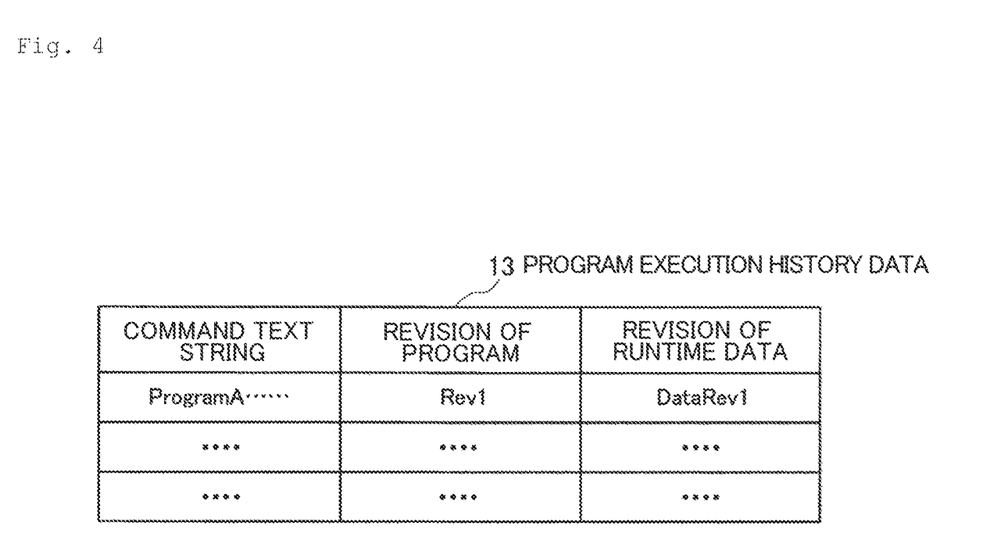
FIG. 4 is a diagram for explaining an example of a data structure and data of program execution history data.

The program execution history data 13 is data in which, as illustrated in FIG. 4, command text strings executed by the processing server 1, revisions of the program, and revisions of runtime data are correlated. Command text strings include program type, and parameters and the like for program runtime may be set. The program revision identifies revisions of program types specified by command text strings. Revisions of runtime data are revisions of runtime data used when executing programs specified by command text strings. The example in the first row in FIG. 4 shows that the program of Rev1 of ProgramA was executed using runtime data of DataRev1. The program execution history data 13 is updated when execution of a program is input.

Each of the execution area data 14a, 14b, and 14c is data of an execution area that executes a program that is the target of management by the processing server 1. Execution area data 14 is provided each time the processing server 1 executes a program. The execution area data 14a includes execution target data 141a and dummy data 142a. In the same way as the execution area data 14a, the execution area data 14b includes execution target data 141b and dummy data 142b, and the execution area data 14c includes execution target data 141c and dummy data 142c. The example of FIG. 1 illustrates that three programs are executed in parallel.

Suppose that the pieces of execution area data 14a, 14b, and 14c in the embodiment of the present invention are not particularly distinguished. In the above case, the data may be simply referred to as execution area data 14. Also, the execution area data 14 includes execution target data 141 and dummy data 142.

The execution area data 14 is data stored in the data region appropriated to the storage device 10, when a program is executed, for storing data used for execution of that program. The may be used by the processing server 1 as the storage device 10. A storage medium which may be used for the storage device 10 specifically includes not only hard disks and SSDs, but also various types of storage media such as RAM.

The execution target data 141 is data of the program to be executed by the processing device 20. A case will be described where in the embodiment of the present invention, the execution target data 141 is a duplication of a program of a revision that is a target of execution. The execution target data 141 is the same as the data of the program identified by the program revision data 11. However, the execution target data 141 is stored in a storage region that is different from that of the data of the program identified by the program revision data 11. The execution target data 141 may be a duplicate of data of a program, or may be a duplicate of data compiled from program code.

The dummy data 142 includes data to which a dummy value has been set in each of the files of the runtime data of a program. Dummy values may be meaningless values, or may be null values.

Figure 5:
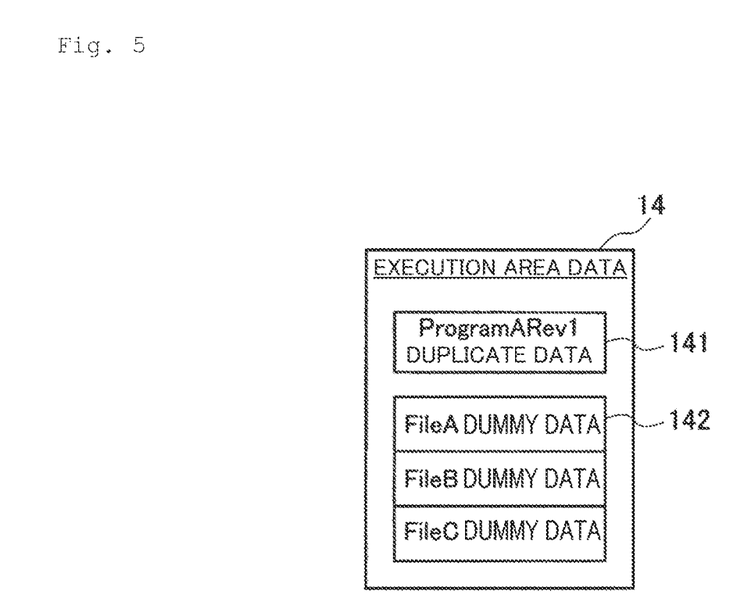
FIG. 5 is a diagram for explaining an example of a data structure of execution area data.

FIG. 5 shows the execution area data 14 for program runtime shown in FIG. 4. As shown in the program execution history data 13 in FIG. 4, in a case in which Rev1 of ProgramA is specified as the program, the execution area data 14 includes ProgramRev1 duplicate data 141 which is data of Rev1 of ProgramA. Also, suppose that Rev1 of ProgramA inputs or outputs FileA, FileB, and FileC. In the above case, the dummy data 142 of the execution area data 14 includes FileA dummy data, FileB dummy data, and FileC dummy data, which are dummy data of FileA, FileB, and FileC.

Note that even in a case of holding data of the difference as to the parent revision as runtime data of a predetermined revision as shown in FIG. 3, data of each of the files input and output by the program is set in the dummy data 142. Each dummy data 142 for executing the program with the runtime data of DataRev2, DataRev3, and DataRev4, of which DataRev1 is the parent revision, also includes the data of FileA, FileB, and FileC, in which dummy values have each been set in the same way as with DataRev1.

The processing device 20 includes the management unit 21, the generating unit 22, and the executing unit 23.

The management unit 21 manages the program revision data 11, the runtime revision data 12, and the program execution history data 13. The management unit 21 accesses the program revision data 11, the runtime revision data 12, or the program execution history data 13 and performs referencing, new creation, branching, integration, data updating, or the like of revisions in accordance with instructions received from an input device, for example.

In a case in which data identifying a program that is the target of execution is input, and the program identified by the input data is not identified by the program revision data 11, the management unit 21 correlates a new revision to data identifying the program that is the target of execution and updates the program revision data 11.

After performing alteration of a program in a work region of the storage device 10 and receiving an instruction for executing the post-alteration program, the management unit 21 registers the program in the work region in the program revision data 11, for example. The management unit 21 stores a record in the program revision data 11, the record being obtained by correlating the program type of the program in the work region, a newly-numbered revision, and data identifying the program in the work region.

By the management unit 21 performing revision management of the program during runtime of the program in the work region in this way, the revisions of the program can be appropriately managed.

Also, in the embodiment of the present invention, the management unit 21 relays access to the program revision data 11, the runtime revision data 12, or the program execution history data 13 on the basis of requests from the generating unit 22 or the executing unit 23 which will be described later. As another embodiment, the generating unit 22 and the executing unit 23 may each access the program revision data 11, the runtime revision data 12, or the program execution history data 13.

After receiving a command for executing a program, the generating unit 22 performs various types of preparation for executing that command.

First, after receiving a revision of a program that is the target of execution, the generating unit 22 secures an execution area in the storage device 10 for executing the program of the revision that has been input. In the embodiment of the present invention, the generating unit 22 generates, in the secured execution area, a duplicate of the revision of the program that is the target of execution. In the embodiment of the present invention, the data of the program to be executed is data in a storage region that is different from that of the data of the program that is directly identified by the program revision data 11, and an execution area is secured for each program that is the target of execution. Accordingly, a plurality of programs can be executed in parallel without interfering with each other.

The generating unit 22 secures an execution area in the storage device 10, the execution area being for executing the program corresponding to the input command text string. The secured execution area is the execution area data 14. The generating unit 22 sets a duplicate of the data of the program that is the target of execution in the execution target data 141 of the execution area data 14. Specifically, the generating unit 22 requests the management unit 21 for the program data that is the target of execution, and the management unit 21 returns a duplicate of the program data that is the target of execution from the program revision data 11 to the generating unit 22. The generating unit 22 stores the duplicate of the program data that is the target of execution acquired from the management unit 21 in the execution area as the execution target data 141.

Also, the generating unit 22 further generates the dummy data 142 corresponding to the runtime data that is the target of execution in the execution area. The dummy data 142 is data that is set in the execution area data 14 and in which dummy values for each of the files input and output by the program have been set.

The generating unit 22 updates the runtime revision data 12 with regard to the new revision of runtime data for executing the input command. The existing revision of runtime data identified from the input command text string is set to the parent revision of the runtime revision data 12 at this time. Specifically, the generating unit 22 inputs a request to the management unit 21, the request being for generating a new revision of runtime data specifying the existing revision of runtime data identified from the input command as the parent revision. The management unit 21 generates the new runtime revision in accordance with the instruction from the generating unit 22. The generating unit 22 also acquires filenames included in the new runtime revision from the management unit 21 at this time. The generating unit 22 stores dummy data 142 in the execution area, the dummy data being obtained by correlating the dummy values with the filenames that are acquired.

Setting dummy files in the execution area of the program hooks access to the dummy files in the program runtime, and the program can be made to access the runtime data that is the target of execution in the runtime revision data 12. This eliminates the necessity to incorporate, into the program, a particular arrangement for using the revision management according to the embodiment of the present invention. Also, the revision management according to the embodiment of the present invention can be easily applied to already-existing programs.

After receiving a command text string for program execution, the generating unit 22 updates the program execution history data 13 regarding the command text string. Note that a command text string identifies at least the type of program to be executed. Also, the revision of the program and the revision of runtime data input to the program are identified by means of the command text string or other inputs. The generating unit 22 includes a record in the program execution history data 13, the record being obtained by correlating the input command text string, the revision of the program, and the revision of the new runtime data. This new runtime data revision is the revision of runtime data of which the revision of runtime data identified by the command text string is the parent.

Also, if data identifying a program that is the target of execution is input and the program identified from the input data is not identified by the program revision data, the generating unit 22 requests the management unit 21 to update the program revision data 11 with a new revision correlated to the program that is the target of execution. After the program that is the target of execution is registered in the program revision data 11, the generating unit 22 acquires a duplicate of that program from the management unit 21, and stores it in the execution area as the execution target data 141.

Generating processing performed by the generating unit 22 will be described with reference to FIG. 6.

First, in step S11, the generating unit 22 stands by for input of an execution command of a program. After receiving an execution command, in step S12, the generating unit 22 determines whether the program that is the target of execution is already set in the program revision data 11. If the program is already set, the process advances to step S14.

If the program is not already set, in step S13, the generating unit 22 inputs a request to the management unit 21, the request being for updating the program revision data 11. The management unit 21 generates a record in which a new revision is correlated with the program that is the target of execution and inserts the generated record into the program revision data 11. Once the program revision data 11 is updated, the process advances to step S14.

In step S14, the generating unit 22 inputs, to the management unit 21, a request for numbering the new revision, correlating it with the new runtime data and updating the runtime revision data 12. The new runtime data is empty data such as data in which null is set, for example. The revision of the runtime data specified by the command or the like input in step S11 is set in the runtime revision data 12 as the parent revision of this new runtime data.

In step S15, the generating unit 22 secures an execution area for executing the command input in step S11 in the storage device 10. In step S16, the generating unit 22 copies the program data that is the target of execution, and the dummy runtime data, into the execution area secured in step S15.

In step S16, the generating unit 22 inputs, to the management unit 21, a request for registering the revision of the program that is the target of execution and the revision of the runtime data newly created in step S14 in the program execution history data 13.

Figure 6:
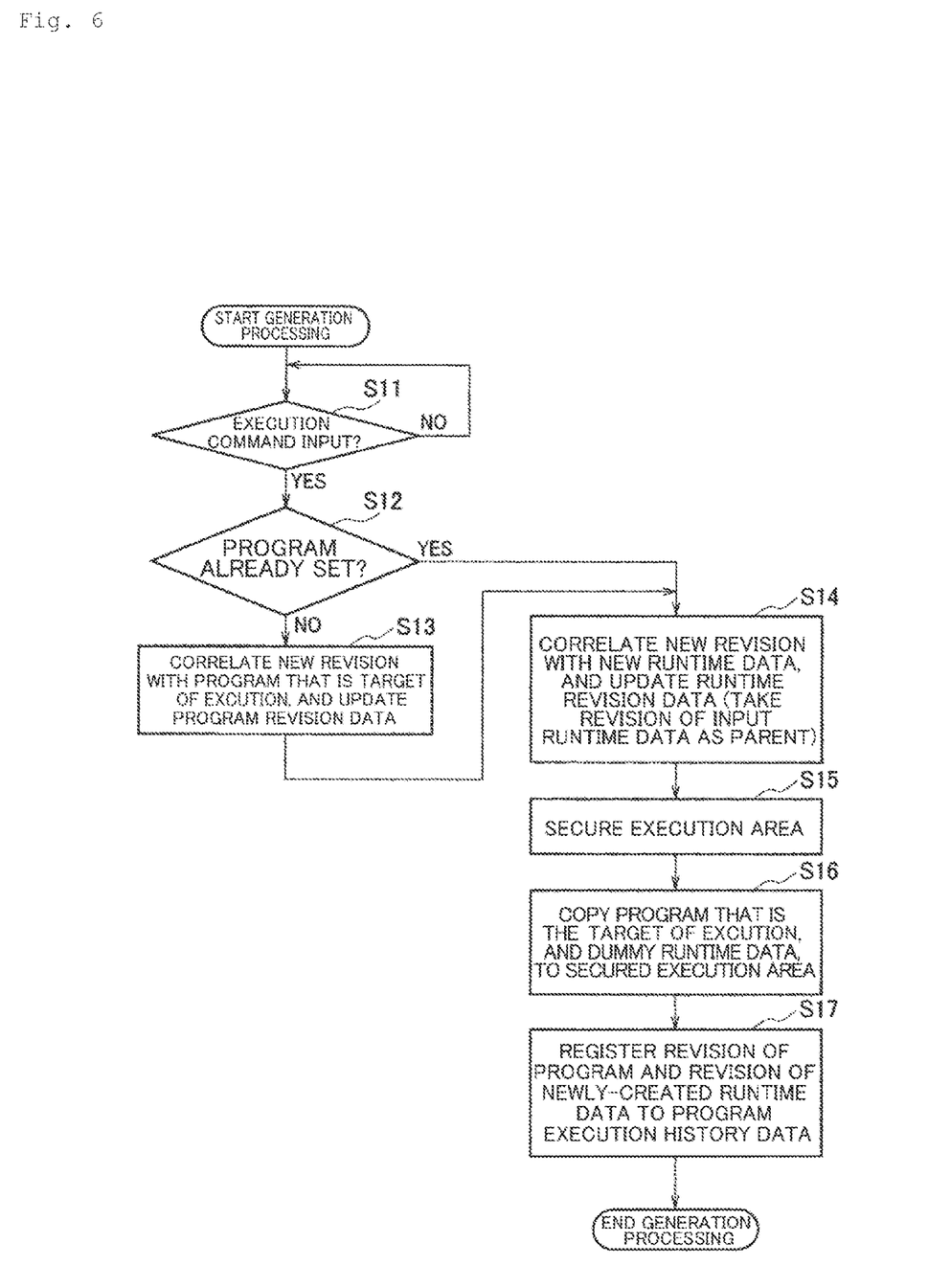
FIG. 6 is a flowchart for explaining generation processing performed by a generating unit of the processing server according to the embodiment of the present invention.

Note that the order of processing shown in FIG. 6 is an example, and the order is not limited thereto.

The executing unit 23 executes duplication of the program in the execution area. The executing unit 23 executes the duplicated program in the execution area secured by the generating unit 22.

The executing unit 23 includes a hooking unit 24 that, upon access to the dummy data being hooked in execution of the duplicated program, accesses the runtime data of the revision that is the target of execution in the runtime revision data 12. Upon the hooking unit 24 hooking access to the dummy data, the executing unit 23 inputs and outputs runtime data of the revision that is the target of execution in the runtime revision data 12 instead of inputting and outputting data of the dummy data 142. More specifically, if access to the dummy data is hooked, the hooking unit 24 is made through the management unit 21 to access a file of the revision that is the target of execution in the runtime revision data 12, which is a file of the same name as the hooked filename.

In a case of correlating data of difference as to the parent revision as the runtime data that is the target of execution in the runtime revision data 12, the hooking unit 24 determines, through the management unit 21, whether a file that is the target of input is included in the runtime data of the revision that is the target of execution, regarding which access to the dummy data 142 is input. If no file that is the target of input is included in the runtime data of the revision that is the target of execution, the hooking unit 24 references the runtime data of the parent revision of the revision that is the target of execution through the management unit 21. If there is no file that is the target of input in the runtime data of the parent revision, the hooking unit 24 searches for the desired file by further sequentially tracing the parent of the parent revision through the management unit 21.

Also, the executing unit 23 generates log data in which the courses of processing that have elapsed such as accessing runtime data are summarized. The executing unit 23 inputs a request to the management unit 21, the request being for correlating the generated log data with the revision of runtime data that is the target of execution in the runtime revision data 12 and storing it. The management unit 21 stores the log data acquired from the executing unit 23 in the runtime revision data 12.

Execution processing performed by the executing unit 23 will be described with reference to FIG. 7.

In step S51, the executing unit 23 executes the program, and upon an event occurring in step S52, allocates the processing depending on the type of the event. In a case in which the event is ending the program, the executing unit 23 ends the processing there. In a case in which the event is one in which access to a file is hooking, the process advances to step S53. In step S53, the executing unit 23 allocates the processing depending on the type of access to the file.

In a case in which the type of access to the file is input, in step S54 the executing unit 23 references the runtime revision data 12 through the management unit 21 and determines whether there is a file that is the target of input in the revision that is the target of execution. If there is a file, in step S55, the executing unit 23 references the runtime data of the revision that is the target of execution in the runtime revision data 12 through the management unit 21 and inputs the file that is the target of input to the program.

Alternatively, if there is no file that is the target of input in the revision that is the target of execution, in step S56, the executing unit 23 identifies the parent revision of the revision that is the target of execution in the runtime revision data 12 through the management unit 21, references the runtime data of the parent revision, and inputs the file that is the target of input to the program. Note that if there is no file that is the target of input in the runtime file of the parent revision, the executing unit 23 references the runtime file of the further parent revision thereof.

If the type of access to the file is output, in step S57, the executing unit 23 stores the file that is the target of output as runtime data of the revision that is the target of execution in the runtime revision data 12 through the management unit 21.

Upon any one of the processing of step S55 to step S57 ending, in step S58, the executing unit 23 records processing of any one of step S55 to step S57 in the log data. After recording processing in the log data, the process returns to step S51, and execution of the program is continued.

Figure 7:
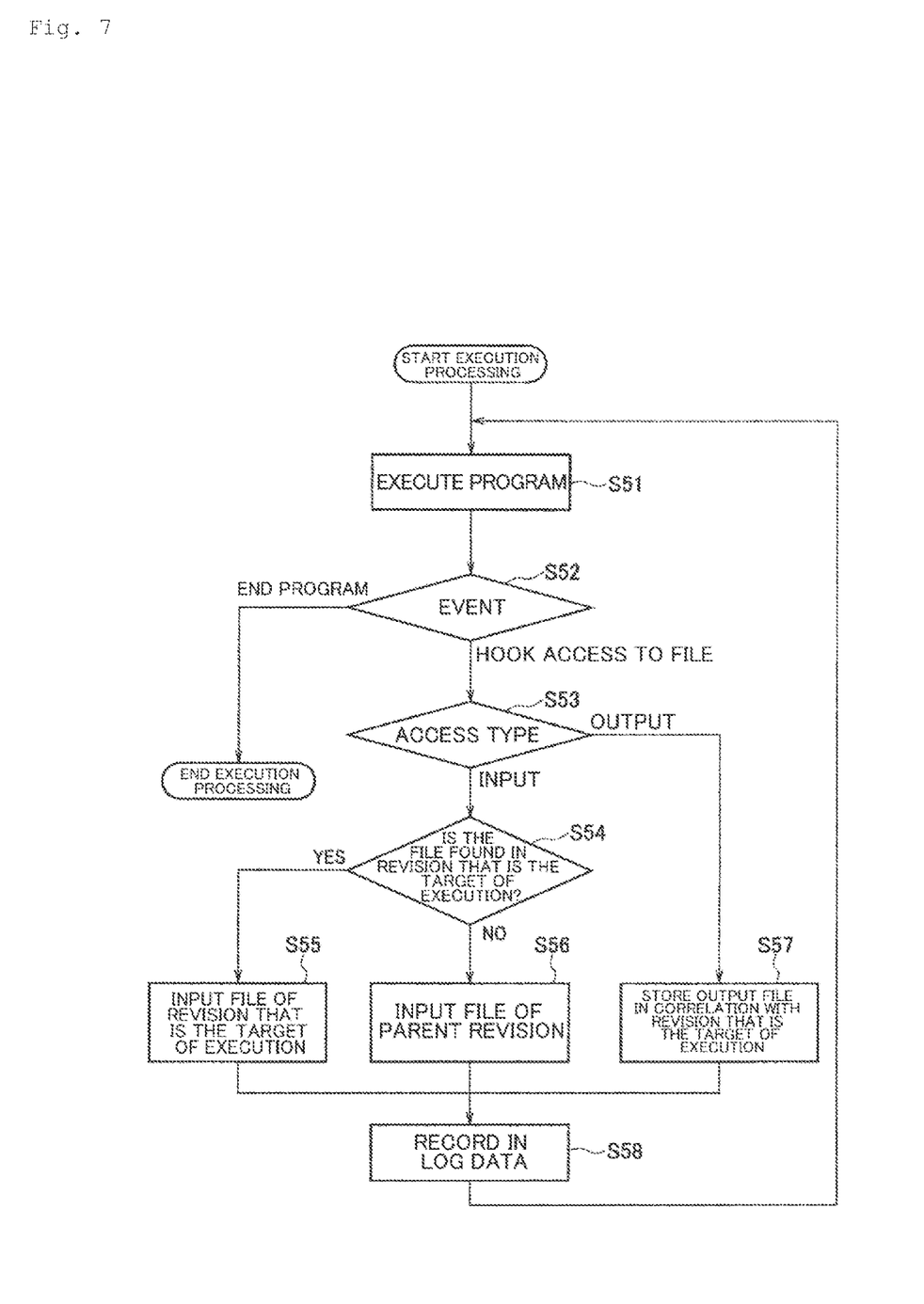
FIG. 7 is a flowchart for explaining execution processing performed by an executing unit of the processing server according to the embodiment of the present invention.

Note that the order of processing shown in FIG. 7 is an example, and the order is not limited thereto.

Figure 8:
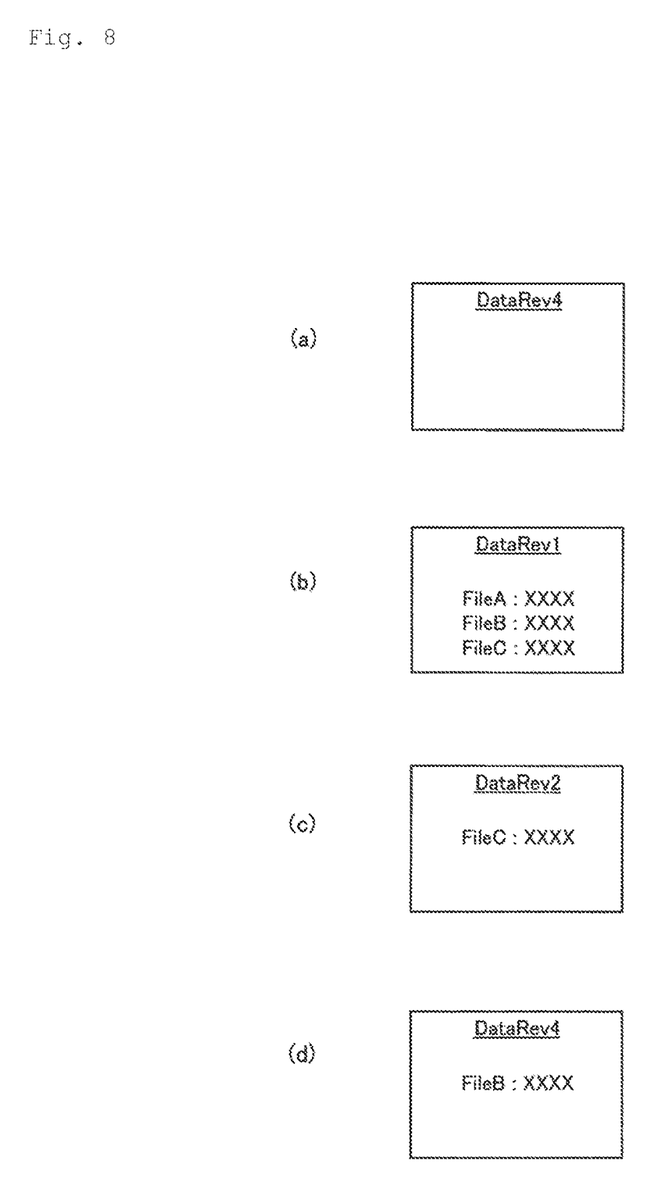
FIG. 8 is a diagram for explaining an example of runtime data.

Runtime data of the runtime revision data 12 during program runtime will be described with reference to FIG. 8. A case will be described in which the revision of runtime data that is the target of execution is DataRev4. At the time of starting execution of the program, DataRev4 contains no file data as shown in FIG. 8(*a*). Also, as shown in FIG. 3, the parent revision of DataRev4 is DataRev2, and the parent revision of DataRev2 is DataRev1. Also, DataRev1 contains the data of FileA, FileB, and FileC as shown in FIG. 8(*b*). DataRev2 contains data of FileC as shown in FIG. 8(*c*).

In the situation shown in FIGS. 8(*a*) to 8(*c*), after an input (reference) of the dummy data of FileA or FileB to the program is hooked, the executing unit 23 inputs the data of DataRev1 to the program. After an input (reference) of the dummy data of FileC to the program is hooked, the executing unit 23 inputs the data of DataRev2 to the program. Also, after an output (update) to FileB is hooked, the executing unit 23 correlates the data of FileB after updating to DataRev4 in the runtime revision data 12 and stores it. Note that thereafter, if an input of the dummy data of FileB to the program is hooked, the executing unit 23 inputs the data of FileB of DataRev4 to the program.

Figure 9:
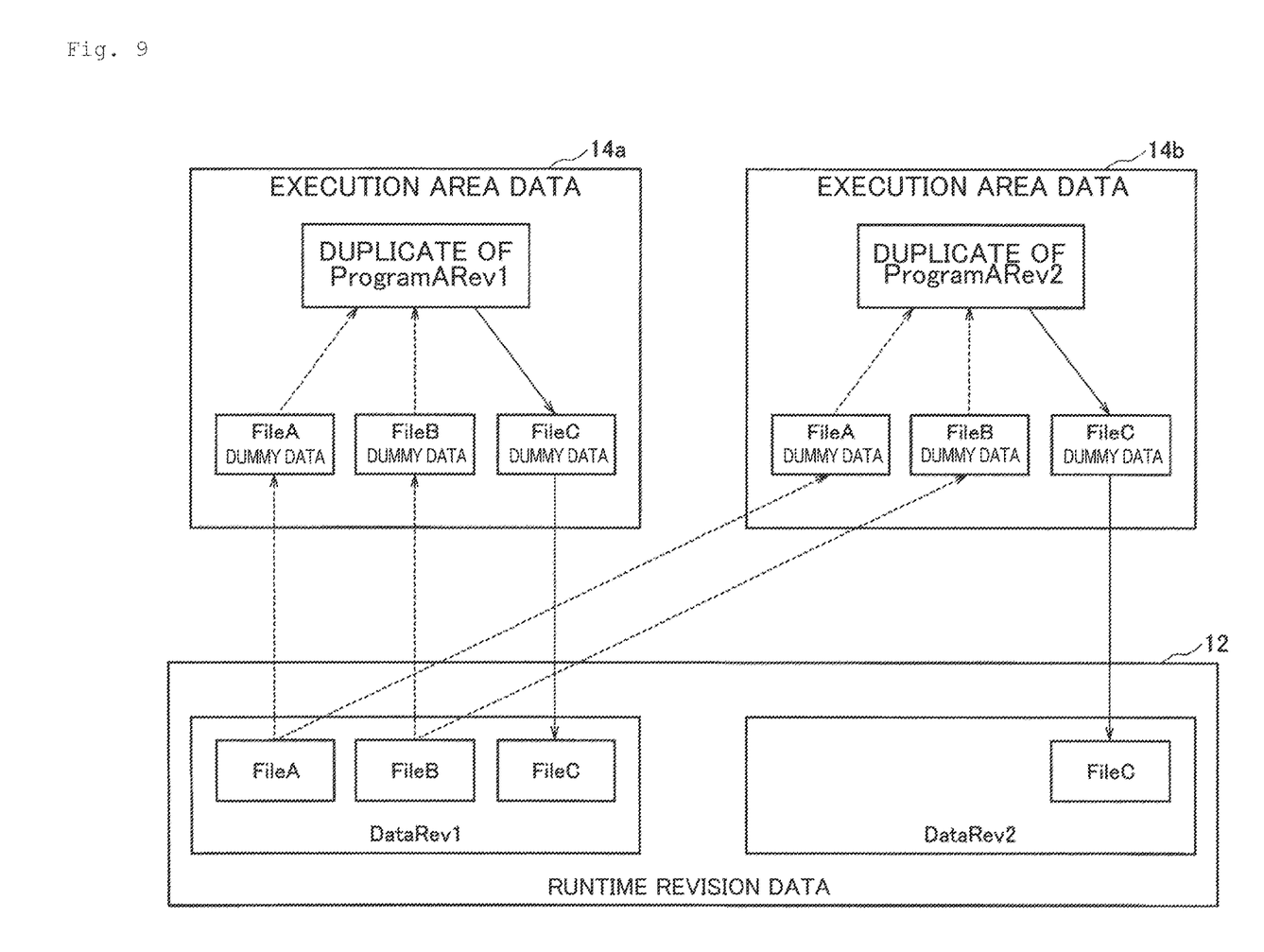
FIG. 9 is a diagram for explaining an example of a relation between the execution area data and the runtime data.

The relation between the execution area data 14 and the runtime revision data 12 will be described with reference to FIG. 9. The example shown in FIG. 9 describes a case in which programs are executed at the same time in the execution areas of the execution area data 14*a* and the execution area data 14*b*. In the execution area data 14*a*, duplication of the program of ProgramARev1 is executed by using the runtime data of DataRev1. In the execution area data 14*b*, duplication of the program of ProgramARev2 is executed by using the runtime data of DataRev2. Note that ProgramARev1 and ProgramARev2 both reference data of FileA and FileB and output data of FileC. Also, DataRev1 is the parent revision of DataRev2.

In such a situation, the execution area data 14*a* and the execution area data 14*b* both include dummy data of FileA, dummy data of FileB, and dummy data of FileC.

In the execution area data 14*a*, in runtime of ProgramARev1, ProgramARev1 accesses the dummy data of FileA in order to input data of FileA. At this time, the hooking unit 24 detects the access to the dummy data of FileA and the executing unit 23 inputs data of FileA of DataRev1 in the runtime revision data 12 to ProgramRev1. Also, in runtime of ProgramARev1, ProgramARev1 accesses the dummy data of FileC in order to output data of FileC. At this time, the hooking unit 24 detects the access to the dummy data of FileC, and the executing unit 23 stores the data of FileC output by ProgramARev1 as runtime data of DataRev1 in the runtime revision data 12.

In the execution area data 14*b*, in runtime of ProgramARev2, ProgramARev2 accesses the dummy data of FileA in order to input data of FileA. At this time, the hooking unit 24 detects the access to the dummy data of FileA. The executing unit 23 inputs data of FileA of DataRev1 that is the parent revision of DataRev2 to ProgramRev2 because there is no data of FileA in DataRev2 in the runtime revision data 12. Also, in runtime of ProgramARev2, ProgramARev2 accesses the dummy data of FileC in order to output data of FileC. At this time, the hooking unit 24 detects the access to the dummy data of FileC and the executing unit 23 stores the data of FileC output by ProgramARev2 as runtime data of DataRev2 in the runtime revision data 12.

In this way, the processing server 1 in the embodiment of the present invention generates new runtime data each time the program is executed and the program references or updates the corresponding runtime data. Accordingly, revisions of each runtime data are appropriately managed.

In the embodiment of the present invention, revisions of programs are managed and the processing server 1 defines runtime data corresponding to new revisions in runtime of the program. Therefore, the executed programs and runtime data in runtime of the programs can both be identified by revision. This revision management does not involve human work, and therefore the processing server can appropriately manage revisions and can ensure reproducibility of execution results of the programs.

Also, an execution environment is allocated for each command executed and execution is performed by means of programs duplicated in these execution environments. Accordingly, even if a plurality of programs are executed in parallel, the programs do not interfere with each other. Also, the runtime data input and output by the program is generated for each execution of the program. Accordingly, even if a plurality of programs are executed in parallel, the runtime data of each program does not interfere with each other and is individually managed. Accordingly, when a plurality of programs are executed, programs or runtime data are not improperly changed and idempotency of the program can be guaranteed.

Also, dummy data is provided in the execution environments, the dummy data being for detection of the program accessing runtime data. Accordingly, the hooking unit 24 of the processing server 1 detects access to the dummy data and the executing unit 23 (or the management unit 21) accesses the runtime data instead of the program. This can appropriately manage revisions of runtime data without making any alterations to the program, the alternations being for accessing the runtime data of a particular revision.

The executing unit 23 records a log when the hooking unit 24 detects access to the dummy data. This enables tracking of accesses to the runtime data.

Further, in the embodiment of the present invention, the difference between runtime data and the runtime data of the parent revision that is the derivation source is identified. Accordingly, it is possible to suppress the data capacity necessary for storing the runtime data.

(Modification)

In the embodiment of the present invention, the execution target data 141 is a duplication of a program of the revision that is the target of execution. However, in a modification, the execution target data 141 is program dummy data of the revision that is the target of execution. The program dummy data includes data in which dummy values have been set in the program of the revision that is the target of execution. Dummy values may be meaningless values, or may be null values. Suppose that a program group configured from a plurality of programs or the like is the target of execution. In the above case, the execution target data 141 includes data in which dummy values have been set to the filenames of each of the programs.

After execution of dummy data of a program is hooked, the hooking unit 24 of the executing unit 23 executes the program of the revision that is the target of execution of the program revision data. After the hooking unit 24 hooks access to program dummy data, the executing unit 23 executes the program that is the target of execution in the program revision data 11 instead of executing the program dummy data. More specifically, after hooking access to program dummy data, the hooking unit 24 is made through the management unit 21 to access a file of the revision that is the target of execution in the program revision data 11, which is a file of the same name as the hooked program.

An arrangement may be made in which, with regard to the program revision data 11, the derivation source revision is identified as the parent revision and the difference as to the parent revision is held, in the same way as with the runtime revision data 12. Also, suppose that a program group that is the target of execution rewrites another program such as a script. In the above case, numbering of the new revision in the program revision data 11 may be performed in runtime of the programs, in the same way as with the runtime revision data 12. The executing unit 23 inputs, to the management unit 21, a request for generating a new revision, of which the revision of the program that is the target of execution, identified from the command text string, is the parent revision. When rewriting of a program occurs, the executing unit 23 inputs a request, to the management unit 21, the request being for correlating the rewritten program with the new revision and holding it.

In this way, suppose that the execution target data 141 held in an execution area is program dummy data. In the above case, even if the program is changed, the processing server 1 numbers the new revision in runtime of the program and saves the programs before and after changing in the program revision data 11. By managing the programs that are the target of execution and the runtime data in the program revision data 11 and the runtime revision data 12, the processing server 1 can ensure idempotency of the programs and reproducibility of execution results of the programs.

Figure 10:
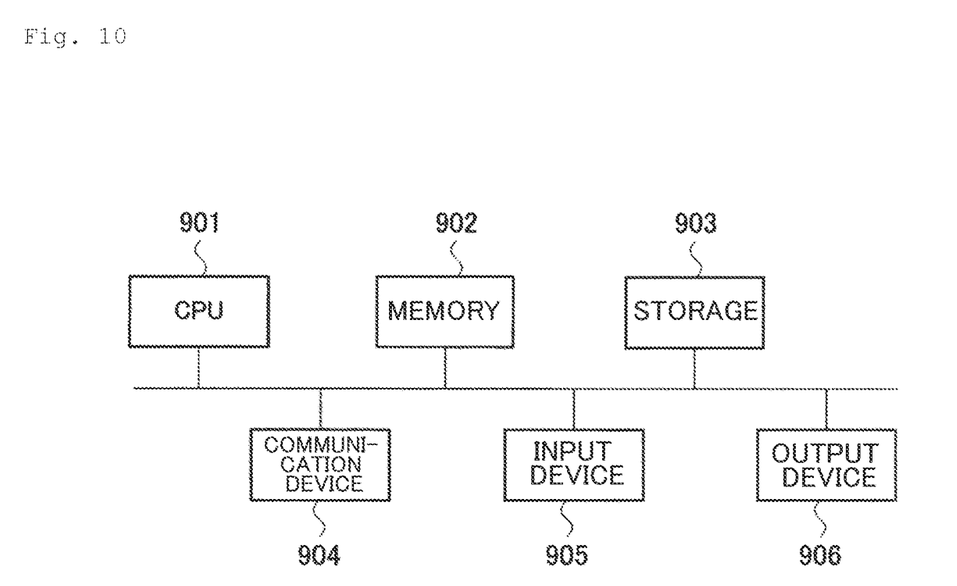
FIG. 10 is a diagram for explaining a hardware configuration of a computer used as the processing server.

For the processing server 1 of the present embodiment described above, a general-purpose computer system is used. The general-purpose computer system includes a CPU (Central Processing Unit, processor) 901, memory 902, storage 903 (HDD: Hard Disk Drive, SSD: Solid State Drive), a communication device 904, an input device 905, and an output device 906. The CPU 901 is the processing device 20. The memory 902 and the storage 903 are the storage device 10. In this computer system, the functions of the processing server 1 are realized by the CPU 901 executing predetermined programs loaded to the memory 902.

Note that the processing server 1 may be implemented by one computer or may be implemented by a plurality of computers. Also, the processing server 1 may be a virtual machine implemented in a computer.

Processing programs of the processing server 1 may be stored in computer-readable recording media such as an HDD, an SSD, USB (Universal Serial Bus) memory, a CD (Compact Disc), and a DVD (Digital Versatile Disc), or may be distributed over a network.

Note that the present invention is not limited to the above embodiment, and various modifications may be made within the scope of the gist of the present invention.

REFERENCE SIGNS LIST

1 Processing server
10 Storage device
11 Program revision data
12 Runtime revision data
13 Program execution history data
14 Execution area data
20 Processing device
21 Management unit
22 Generating unit
23 Executing unit
141 Execution target data
142 Dummy data
901 CPU
902 Memory
903 Storage
904 Communication device
905 Input device
906 Output device

The invention claimed is:

1. A processing server comprising:
a storage device that stores:
program revision data identifying a revision of a program and a revised program of the revision of the program, and
runtime revision data identifying a revision of runtime data input and output to and from the program and a runtime data of the revised program;

a generating unit, comprising one or more processors, configured to, after receiving the revision of the program that is a target of execution, secure an execution area in the storage device and to generate execution target data for executing the revised program that is the target of execution in the secured execution area, wherein the generating unit is configured to generate, in the secured execution area, dummy data corresponding to the runtime data that is the target of execution; and an executing unit, comprising one or more processors, configured to execute the execution target data using the runtime data that is the target of execution in the secured execution area, wherein the executing unit is configured to include a hooking unit that, after access to the dummy data is hooked in execution of the execution target data, accesses the runtime data that is the target of execution of the runtime revision data.

2. The processing server according to claim 1, wherein the execution target data is a duplicate of the revised program that is the target of execution, and wherein the executing unit is configured to execute the duplication of the revised program.

3. The processing server according to claim 1, wherein the execution target data is dummy data of the revised program that is the target of execution, and wherein after execution of the dummy data of the revised program is hooked, the executing unit is configured to execute the revised program that is the target of execution in the program revision data.

4. The processing server according to claim 1, wherein the runtime revision data holds the revision of runtime data in a manner correlated with a parent revision and data of difference as to runtime data of the parent revision, and wherein, if access to the dummy data is input and a file that is a target of input is not included in the runtime data that is the target of execution, the hooking unit references the runtime data of the parent revision.

5. The processing server according to claim 1, further comprising:

a management unit configured to, if data identifying the revised program that is the target of execution is input and the revised program identified from the input data is not identified in the program revision data, correlate a new revision to the data identifying the revised program that is the target of execution and updates the program revision data.

6. A processing method comprising:

storing, in a storage device, program revision data identifying a revision of a program and a revised program of the revision of the program, and runtime revision data identifying a revision of runtime data input and output to and from the program and runtime data of the revised program;

securing, after receiving the revision of the program that is a target of execution, an execution area in the storage device and generating execution target data for executing the revised program that is the target of execution in the secured execution area;

generating, in the secured execution area, dummy data corresponding to the runtime data that is the target of execution; and executing the execution target data using the runtime data that is the target of execution in the secured execution area, wherein the executing the execution target data comprises, after access to the dummy data is hooked in execution of the execution target data, accessing the runtime data that is the target of execution of the runtime revision data.

7. A non-transitory computer-readable medium storing one or more instructions executable by a computer system to perform operations comprising:

storing, in a storage device, (i) program revision data identifying a revision of a program and a revised program of the revision of the program, and (ii) runtime revision data identifying a revision of runtime data input and output to and from the program and a runtime data of the revised program;

securing, after receiving the revision of the program that is a target of execution, an execution area in the storage device and generating execution target data for executing the revised program that is the target of execution in the secured execution area;

generating, in the secured execution area, dummy data corresponding to the runtime data that is the target of execution; and executing the execution target data using the runtime data that is the target of execution in the secured execution comprising, wherein the executing the execution target data comprises, after access to the dummy data is hooked in execution of the execution target data, accessing the runtime data that is the target of execution of the runtime revision data.

\* \* \* \* \*